United States Patent
Takechi et al.

(10) Patent No.: US 9,439,408 B2
(45) Date of Patent: Sep. 13, 2016

(54) DUAL-BEARING REEL

(71) Applicant: Shimano Inc., Sakai, Osaka (JP)

(72) Inventors: Kunio Takechi, Osaka (JP); Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 285 days.

(21) Appl. No.: 14/197,432

(22) Filed: Mar. 5, 2014

(65) Prior Publication Data

US 2014/0263792 A1 Sep. 18, 2014

(30) Foreign Application Priority Data

Mar. 13, 2013 (JP) ................................ 2013-050552

(51) Int. Cl.
*A01K 89/01* (2006.01)
*A01K 89/015* (2006.01)

(52) U.S. Cl.
CPC .................................. *A01K 89/015* (2013.01)

(58) Field of Classification Search
CPC ........... A01K 89/015; A01K 89/0192; A01K 89/01921; A01K 89/01923
See application file for complete search history.

(56) References Cited

U.S. PATENT DOCUMENTS

| | | | | |
|---|---|---|---|---|
| 5,370,331 A * | 12/1994 | Sato | ..................... | A01K 89/015 242/313 |
| 5,743,479 A * | 4/1998 | Miyazaki | ............. | A01K 89/015 242/310 |
| 5,873,535 A * | 2/1999 | Jeung | ................... | A01K 89/015 242/310 |
| 6,460,793 B1 * | 10/2002 | Hirayama | ............ | A01K 89/015 242/313 |
| 7,070,139 B2 * | 7/2006 | Nakagawa | ........... | A01K 89/015 242/313 |
| 2005/0056716 A1 * | 3/2005 | Kawasaki | ............ | A01K 89/015 242/310 |
| 2007/0108330 A1 * | 5/2007 | Ikuta | ................ | A01K 89/01555 242/288 |
| 2007/0246590 A1 * | 10/2007 | Hyun | ................... | A01K 89/015 242/310 |
| 2010/0288866 A1 * | 11/2010 | Nakagawa | ......... | A01K 89/0155 242/289 |
| 2011/0057063 A1 * | 3/2011 | Kawasaki | ............ | A01K 89/015 242/283 |
| 2013/0320125 A1 * | 12/2013 | Hyun | ................... | A01K 89/015 242/312 |

FOREIGN PATENT DOCUMENTS

JP 63-263033 A 10/1988
JP 2570769 Y2 2/1998

* cited by examiner

*Primary Examiner* — Emmanuel M Marcelo
(74) *Attorney, Agent, or Firm* — Global IP Counselors

(57) ABSTRACT

A dual-bearing reel includes a reel unit, a spool, a spool shaft, a handle, and an attachment-detachment operating part, a lock member. The reel unit includes a frame having a first side plate and a second side plate. The attachment-detachment operating part has a protruding portion protruding towards the first side plate from a position away from an axis of the spool shaft. The first side cover is attachable to and detachable from the first side plate when the attachment-detachment operating part is at a first position. The first side cover is non-attachable to and non-detachable from the first side plate when the attachment-detachment operating part is at a second position. The lock member has an engaging groove. The engaging groove is allowed to be engaged with the protruding portion.

13 Claims, 13 Drawing Sheets

DUAL-BEARING REEL

CROSS-REFERENCE TO RELATED APPLICATIONS

This application claims priority to Japanese Patent Application No. 2013-050552 filed on Mar. 13, 2013. The entirety disclosure of Japanese Patent Application No. 2013-050552 is hereby incorporated herein by reference.

BACKGROUND

1. Field of the Invention

The present invention relates to a dual-bearing reel, and particularly to a dual-bearing reel configured to forwardly reel out a fishing line.

2. Background Art

A dual-bearing reel generally includes a reel unit attachable to a fishing rod, a spool disposed inside the reel unit, and a handle mounted to one side of the reel unit. The reel unit includes a frame and a pair of a first side cover and a second side cover for covering the both lateral sides of the frame. The flame further includes a pair of a first side plate and a second side plate and a coupling member for coupling the first side plate and the second side plate. The first side cover is attached to the outside of the first side plate, while the second side cover is attached to the outside of the second side plate. The handle and a star drag are mounted laterally outwards of the second side cover. The first side cover, disposed on the opposite side of a handle attachment side, is attached to the first side plate while being allowed to be opened and closed for attaching-detaching the spool and a brake mechanism to-from the reel unit (e.g., see Japan Registered Utility Model No. 2,570,769 and Japan Examined Utility Model Application No. S63-263033).

In Japan Registered Utility Model No. 2,570,769, the first side cover includes a ring-shaped cam body and an operating tool for operating the cam body. When the cam body is rotated through a pivot operation of the operating tool, the cam body is engaged with or disengaged from engaging pieces protruding from the first side plate. Accordingly, the first side cover is configured to be attached to or detached from the first side plate.

In Japan Examined Utility Model Application No. S63-263033, the first side cover, which serves also as the operating tool is engaged with or disengaged from the first side plate. When rotated, the first side cover is configured to be attached to or detached from the first side plate.

SUMMARY

In the well-known dual-bearing reels as described above, the first side cover is configured to be attached to or detached from the first side plate by operating either the first side cover or the operating tool of the first side cover. However, chances are that the first side cover unexpectedly comes off from the first side plate when an angler erroneously operates the operating tool or when the operating tool performs an erroneous action.

It is an advantage of the present invention to prevent a first side cover from unexpectedly coming off from a first side plate in a dual-bearing reel.

A dual-bearing reel is configured to forwardly reel out a fishing line. The dual-bearing reel includes a reel unit, a spool, a spool shaft, a handle, and an attachment-detachment operating part, a lock member. The reel unit includes a frame having a first side plate and a second side plate disposed opposite to the first side plate, a first side cover being detachably attached to the first side plate and covering an outside of the first side plate, and a second side cover covering an outside of the second side plate. The spool is configured to wind the fishing line. The spool is disposed between the first side plate and the second side plate. The spool is rotatably supported by the reel unit. The spool is mounted onto the spool shaft. The handle is rotatably mounted to the second side cover side to rotationally drive the spool. The attachment-detachment operating part has a protruding portion protruding towards the first side plate from a position away from an axis of the spool shaft. The attachment-detachment operating part is mounted rotatably about the spool shaft between a first position and a second position. The first side cover is attachable to and detachable from the first side plate when the attachment-detachment operating part is at the first position. The first side cover is non-attachable to and non-detachable from the first side plate when the attachment-detachment operating part is at the second position. The lock member has an engaging groove. The engaging groove is allowed to be engaged with the protruding portion. The engaging groove has a first end and a second end. The first end is open. The second end being closed and disposed on an opposite side of the first end. The lock member is mounted to the reel is so as to be movable between a locked position and an unlocked position. The engaging groove being oriented in a first direction arranged different from a direction about the spool shaft in order for the engaging groove to be engaged with the protruding portion when the attachment-detachment operating part is at the second position and when the lock member is at the locked position. The attachment-detachment operating part is rotatable when the lock member is at the unlocked position.

BRIEF DESCRIPTION OF THE DRAWINGS

Referring now to the attached drawings which form a part of this original disclosure.

DETAILED DESCRIPTION OF THE PREFERRED EMBODIMENT

First Exemplary Embodiment

Structure of Reel Unit

Figure 1:
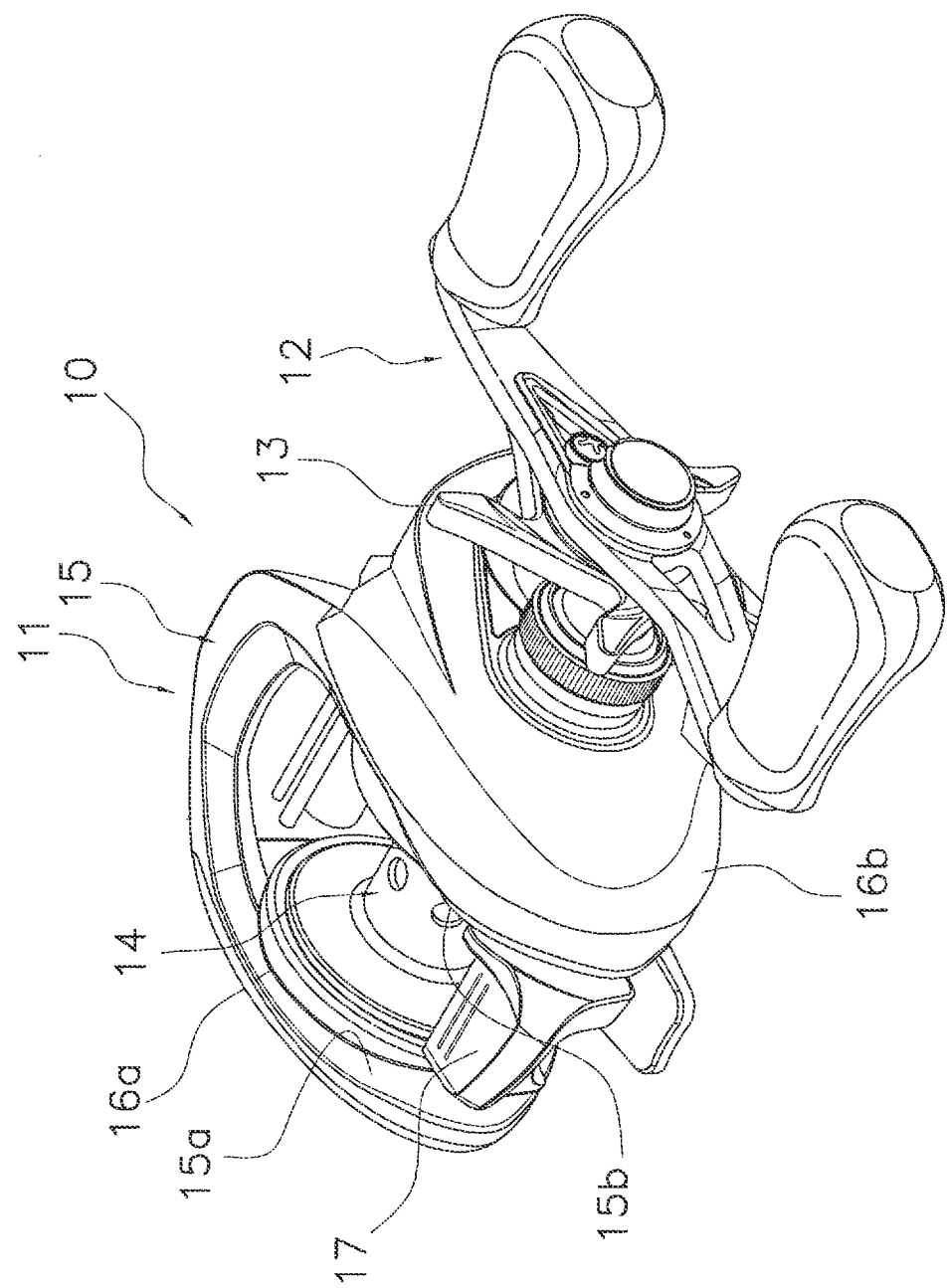
FIG. 1 is a perspective view of a dual-bearing reel according to a first exemplary embodiment of the present invention.
Figure 2:
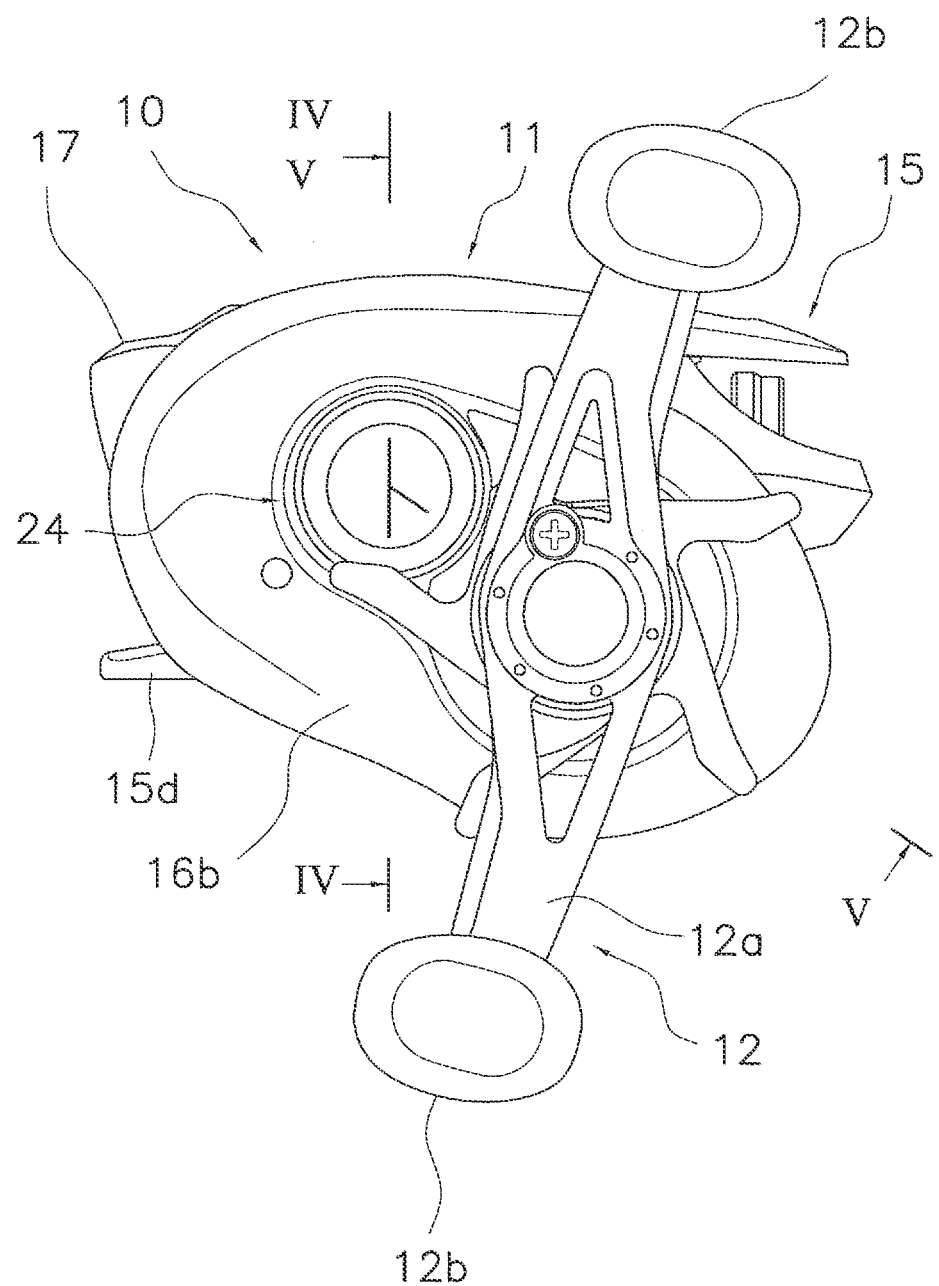
FIG. 2 is a left side view of the dual-bearing reel.

As illustrated in FIGS. 1 to 5, a dual-bearing reel 10 according to a first exemplary embodiment of the present invention is a low-profile dual-bearing reel for bait casting. The dual-bearing reel 10 includes a reel unit 11, a handle 12, a star drag 13, a spool 14, and a spool shaft 20. The handle 12 is disposed laterally to the reel unit 1 in order to rotate and drive the spool 14. The star drag 13 is disposed on the reel unit 11 side of the handle 12 in order to regulate drag force. The spool 14 is a member that a fishing line is wound thereabout. The spool shaft 20 is a member that the spool 14 is mounted thereto.

Figure 5:
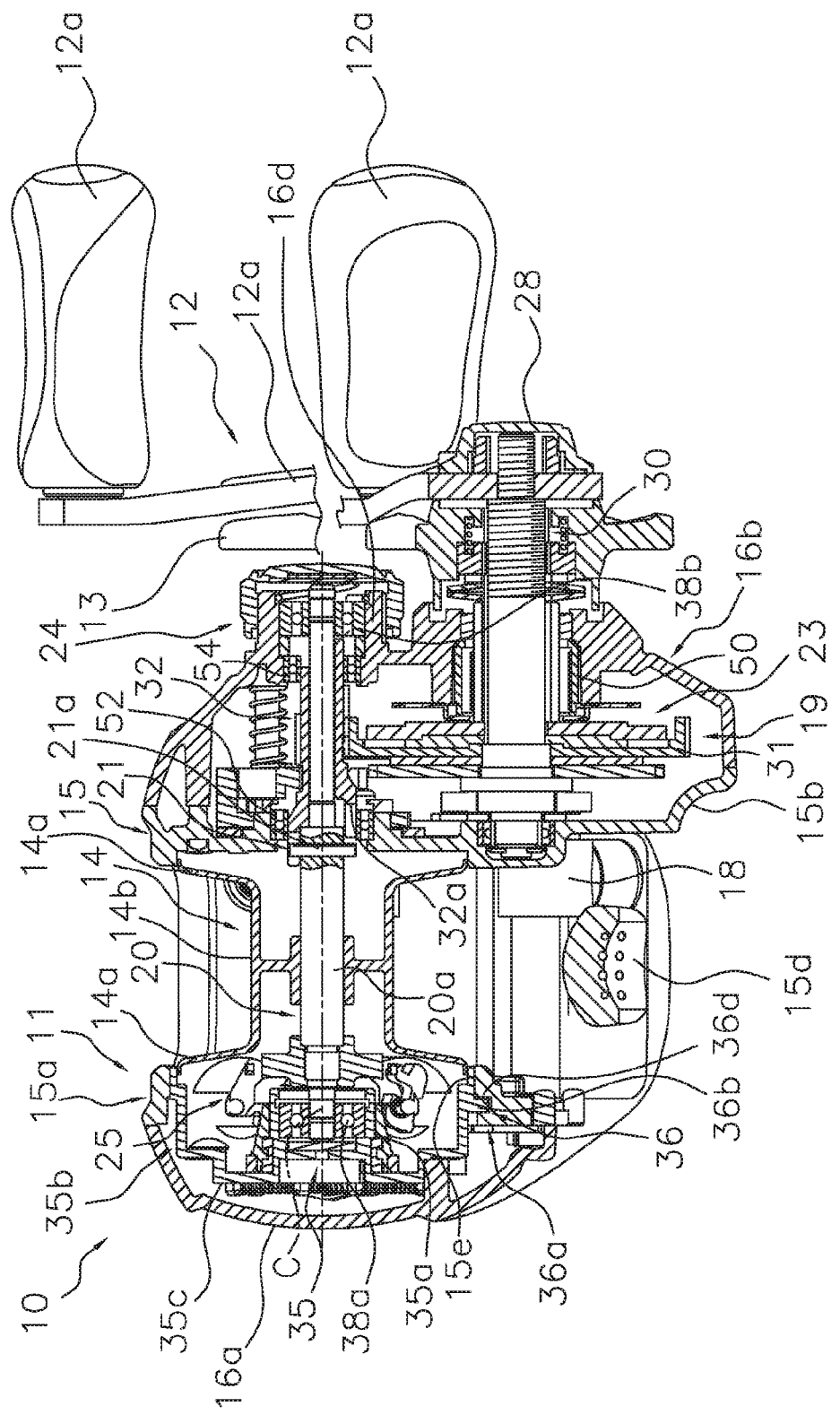
FIG. 5 is a cross-sectional view of the dual-bearing reel taken along a cutaway line V-V in FIG. 2.

The handle 12 is of a double-handle type and includes an arm 12a and knobs 12b rotatably attached to the both ends of the arm 12a. As illustrated in FIG. 5, the arm 12a is non-rotatably attached to the tip end of a drive shaft 30 and is fixed thereto by a nut 28. The handle 12 is disposed on the same side as a second side cover 16b to be described.

Structure of Reel Unit

The reel unit 11 is a member made of light metal such as magnesium alloy. The reel unit 11 includes a frame 15, a first side cover 16a, the second side cover 16b, and a shaft support part 35. The first and second side covers 16a and 16b are attached to the both lateral sides of the frame 15. Further, the spool 14 is rotatably mounted to the interior of the reel unit 11 through the spool shaft 20 (see FIGS. 4 and 5). The first side cover 16a is detachably attached to a first side plate 15a in order to cover the outside of the first side plate 15a. The second side cover 16b is screwed to a second side plate 15b in order to cover the outside of the second side plate 15b.

Moreover, the dual-bearing reel 10 further includes an attachment-detachment operating part 33 and a lock member 34. The attachment-detachment operating part 33 serves to perform an attachment-detachment operation of the first side cover 16a. The lock member 34 is configured to lock the attachment-detachment operating part 33. In the first exemplary embodiment, the first side cover 16a, by itself, functions as the attachment-detachment operating part 33. In other words, the attachment-detachment operating part 33 is provided for the first side cover 16a.

As illustrated in FIG. 5, the frame 15 accommodates the spool 14, a clutch operating member 17 (see FIG. 1), and a level winding mechanism 18. The clutch operating member 17 serves as a thumb pad in thumbing the fishing line. The level winding mechanism 18 is configured to uniformly wind the fishing line about the spool 14. Further, a gear mechanism 19, a clutch mechanism 21, a clutch control mechanism 22, a drag mechanism 23, and a casting control mechanism 24 are disposed between the frame 15 and the second side cover 16b. The gear mechanism 19 is provided for transmitting the rotational force from the handle 12 to the spool 14 and the level winding mechanism 18. The clutch mechanism 21 is provided for coupling-decoupling the spool 14 and the handle 12. The clutch control mechanism 22 is provided for controlling the clutch mechanism 21 in response to the operation of the clutch operating member 17. The drag mechanism 23 is provided for braking the rotation of the spool 14 in a fishing-line releasing direction. The casting control mechanism 24 is provided for regulating resistive force produced when the spool 14 is rotated. On the other hand, a spool brake mechanism 25 is disposed between the frame 15 and the first side cover 16a. The spool brake mechanism 25 is provided for inhibiting occurrence of backlash in casting by centrifugal force.

Figure 4:
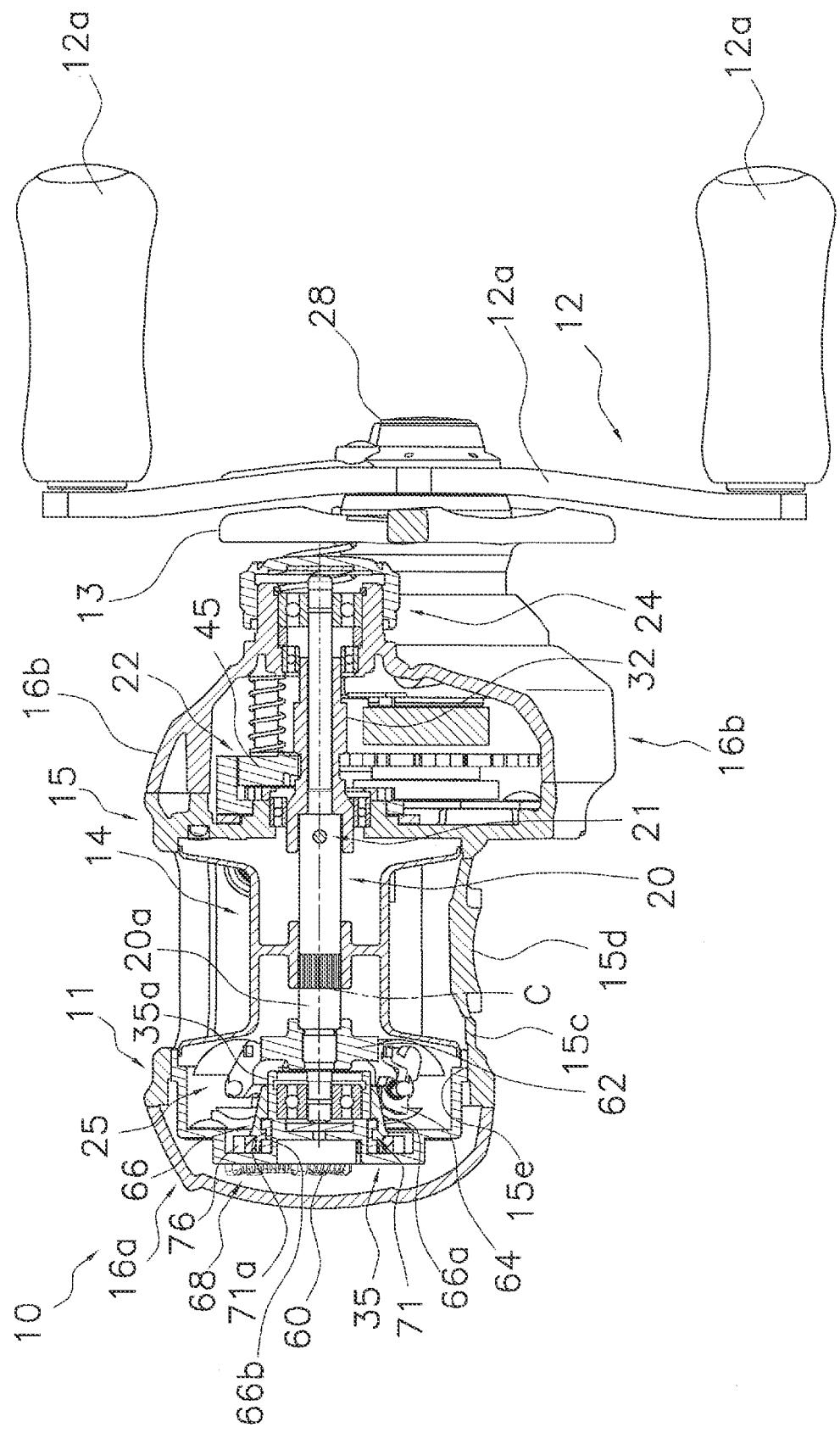
FIG. 4 is a cross-sectional view of the dual-bearing reel taken along a cutaway line IV-IV in FIG. 2.
Figure 6:
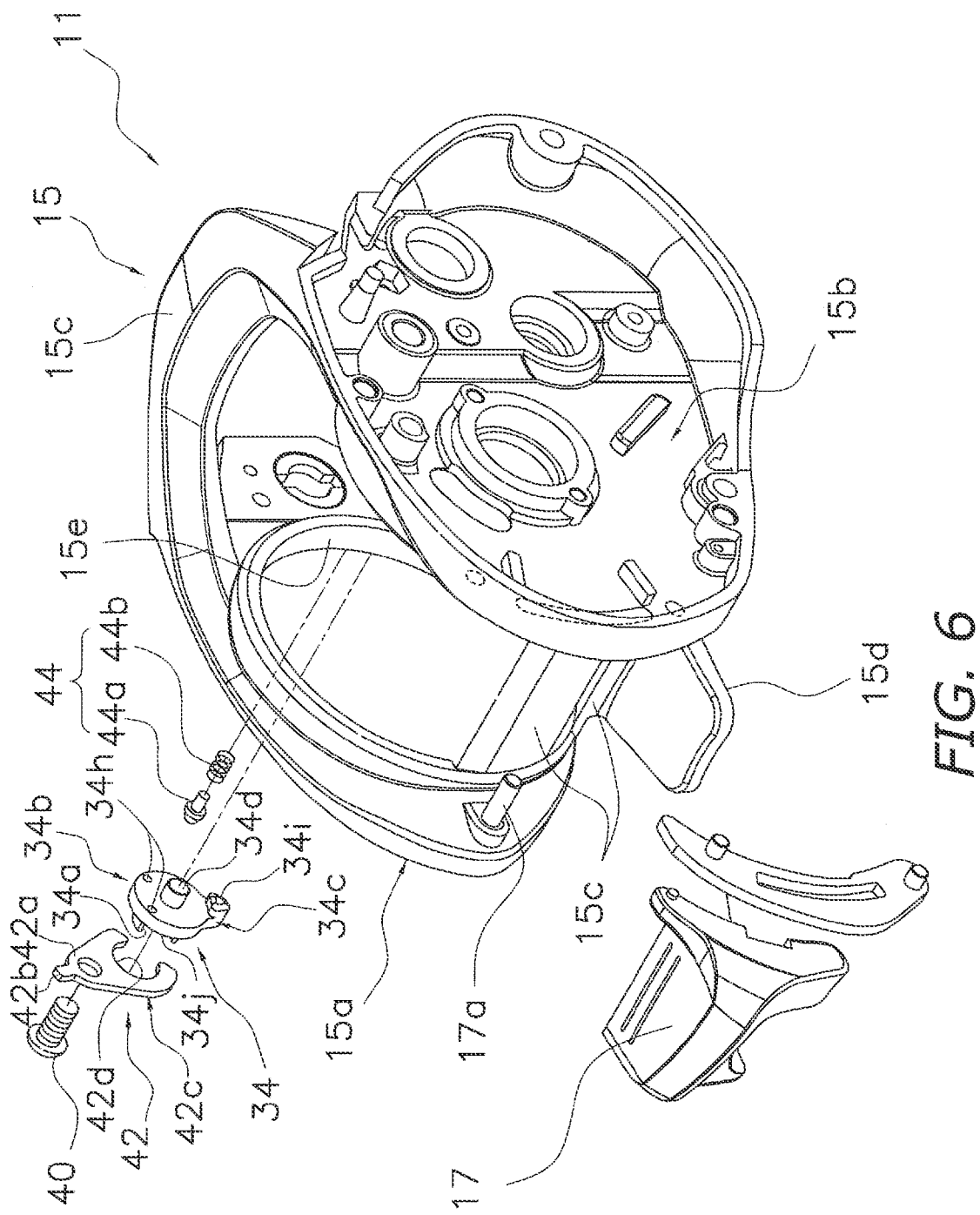
FIG. 6 is an exploded perspective view of a frame and a lock member.

As illustrated in FIGS. 4 to 6, the frame 15 includes the first side plate 15a, the second side plate 15b, and a plurality of (e.g., three) coupling portions 15c. The first and second side plates 15a and 15b are disposed in opposition to each other at a predetermined interval. The coupling portions 15c integrally couple the first side plate 15a and the second side plate 15b at the front, rear, and bottom portions of the frame 15. The bottom one of the coupling portions 15c is integrally formed with a fishing-rod attachment portion 15d for attaching a fishing rod thereto.

The first side plate 15a has an opening 15e in the center part thereof. The opening 15e is circularly formed about an axis C of the spool shaft 20. The shaft support part 35 is detachably coupled to the opening 15e by a bayonet structure 36.

Structure of Shaft Support Part

As illustrated in FIGS. 5 and 7 to 9, the shaft support part 35 is a closed-end tubular member made of metal such as aluminum alloy. It should be noted that in FIGS. 8 and 9, the first side cover 16a (i.e., the attachment-detachment operating part 33) is depicted with a dashed two-dotted line in order to make the shaft support part 35 clearly viewable. The shaft support part 35 has a bearing accommodating portion 35a, an attaching portion 35b, and a bottom portion 35c. The bearing accommodating portion 35a is a small-diameter portion that accommodates a bearing 38a for supporting one end of the spool shaft 20. The attaching portion 35b is a large-diameter portion to be fitted to the opening 15e. The bottom portion 35c is a stepped disc portion that couples the bearing accommodating portion 35a and the attaching portion 35b. The bearing 38a is accommodated in an inner periphery 35d of the bearing accommodating portion 35a. On the other hand, a brake cam 71 of a moving mechanism 68 (to be described) of a spool brake device 25 is coupled to an outer periphery 35e of the bearing accommodating portion 35a, while being non-rotatable and axially immovable. Further, a brake drum 66 of the spool brake device 25 is supported by the outer periphery 35e, while being rotatable and axially movable. A fitting portion 35g and a tubular portion 35h are formed on an outer peripheral surface 35f of the attaching portion 35b. The fitting portion 35g is fitted to the opening 15e. The tubular portion 35h has a diameter smaller than that of the fitting portion 35g. The shaft support part 35 is fixed to the first side cover 16a by a plurality of (e.g., three) screw members 80. An operating member 60 (to be described) of the spool brake device 25 is rotatably attached to the shaft support part 35.

Structure of Bayonet Structure

As illustrated in FIGS. 5 and 7 to 9, the bayonet structure 36 includes a plurality of (e.g., four) cam receivers 36a and a plurality of (e.g., four) cam protrusions 36b. The cam receivers 36a are formed on the outer lateral surface of the first side plate 15a, while being circumferentially aligned at intervals in the surrounding of the opening 15e. The cam protrusions 36b are integrally formed with the tubular portion 35h of the attaching portion 35b of the shaft support part 35, while being radially protruding. Each cam receiver 36a has an engaging groove 36c that can be elastically engaged with each cam protrusion 36b. The cam protrusions 36b are circumferentially disposed at intervals such that they can be respectively positioned in opposition to the cam receivers 36a. Each cam protrusion 36b has a pair of tapered surfaces 36d formed on the both circumferential ends of the first side cover 16a side surface thereof. The tapered surfaces 36d are slanted such that each cam protrusion 36b is reduced in the thickness thereof towards the both circumferential ends thereof.

Structure of Attachment-Detachment Operating Part

Figure 8:
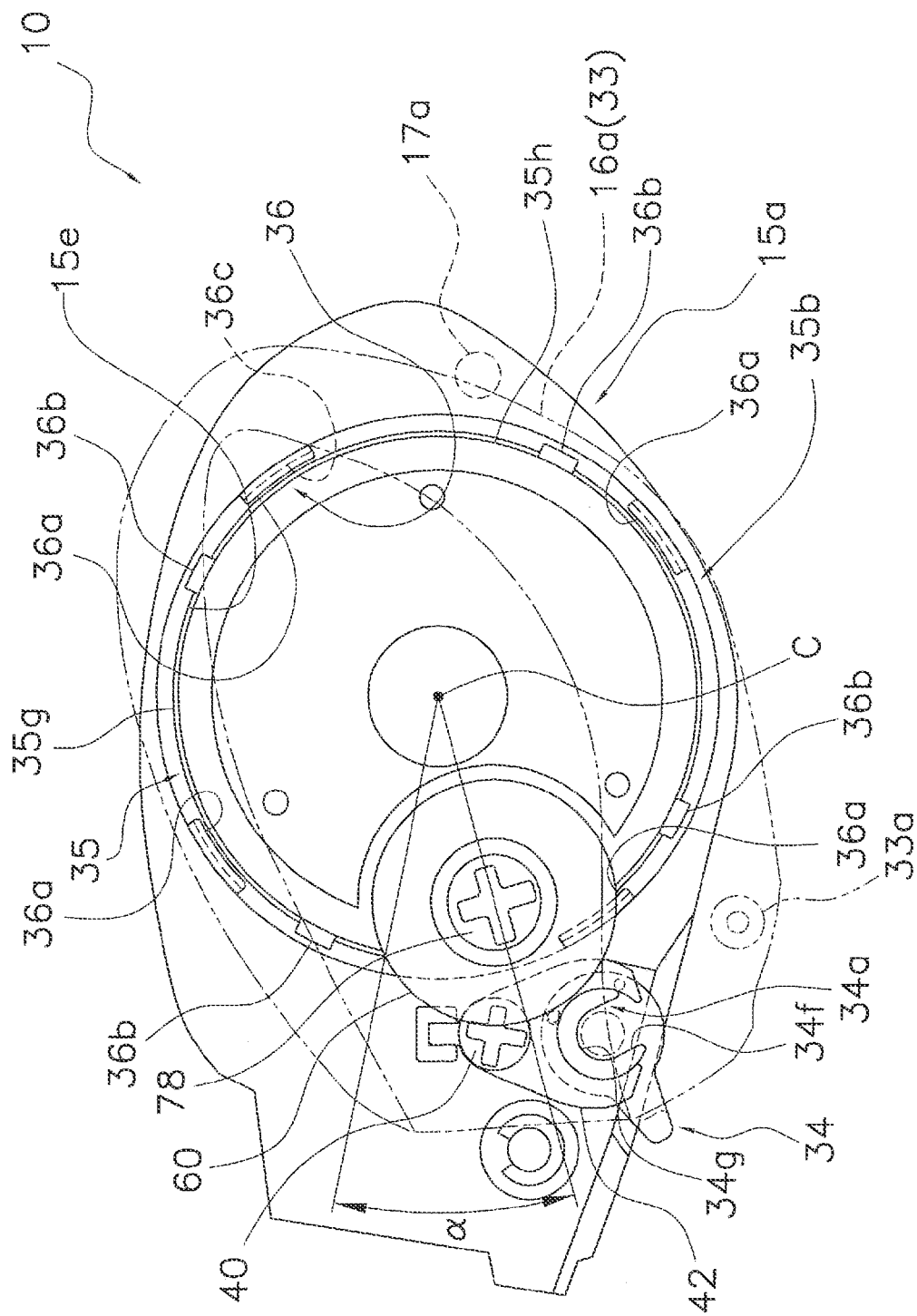
FIG. 8 is a side view of the dual-bearing reel when an attachment-detachment operating part is set in a first position.
Figure 9:
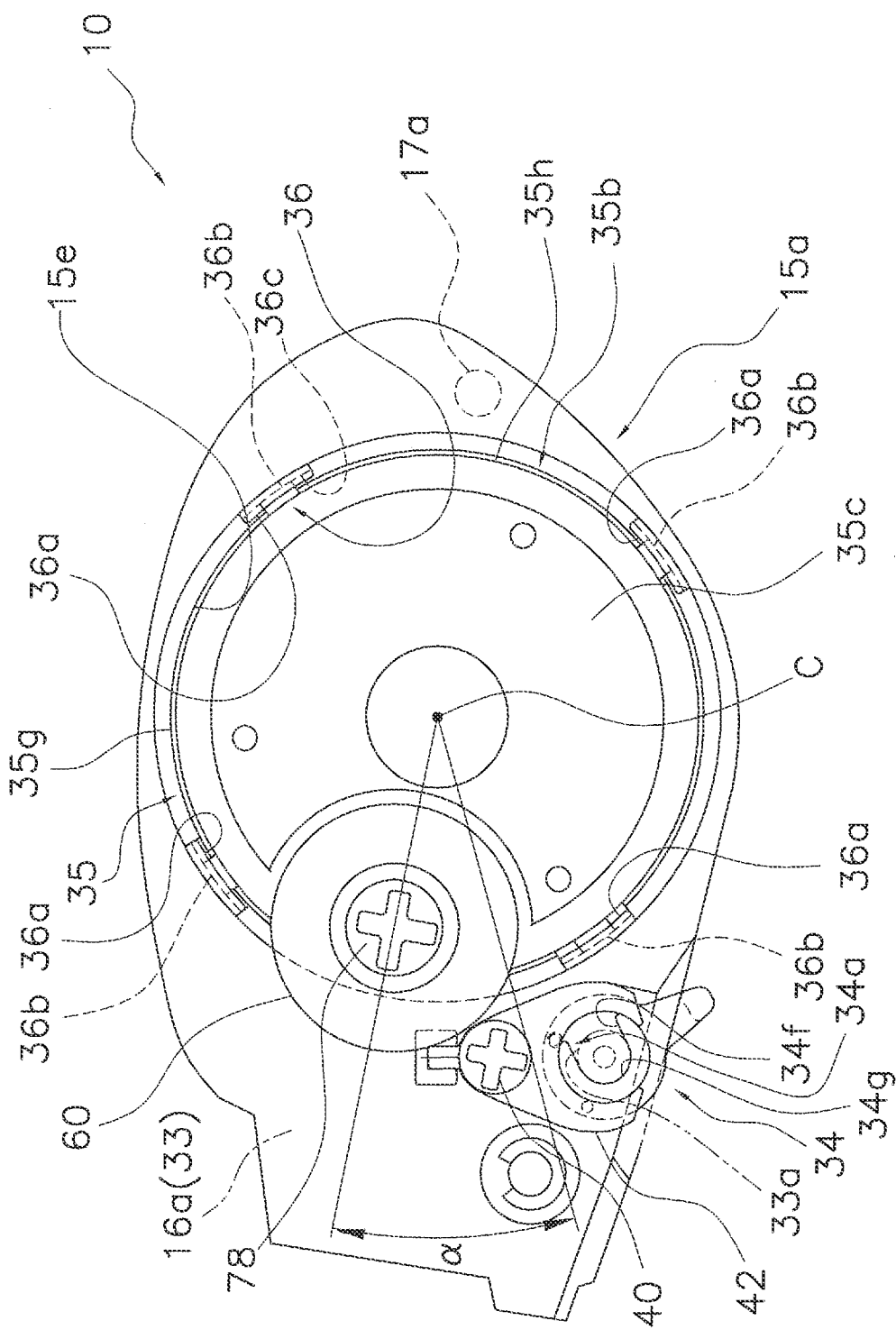
FIG. 9 is a side view of the dual-bearing reel when the attachment-detachment operating part is set in a second position.
Figure 10:
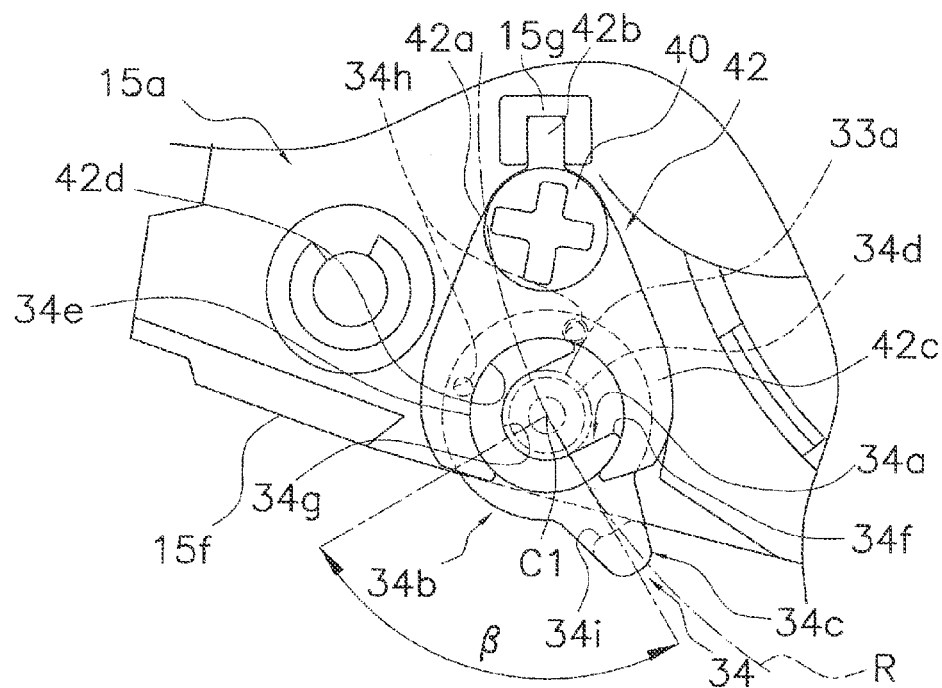
FIG. 10 is an enlarged view of the dual-bearing reel illustrated in FIG. 8 when the lock member is set in a locked position.
Figure 11:
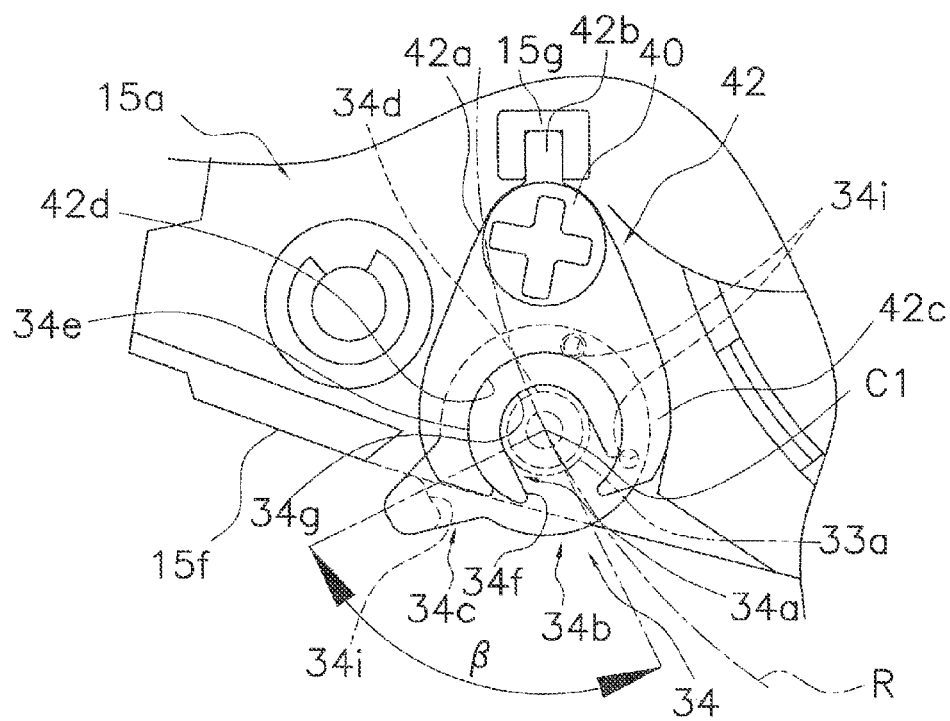
FIG. 11 is an enlarged view of the dual-bearing reel illustrated in FIG. 8 when the lock member is set in an unlocked position.

The attachment-detachment operating part 33 is disposed while being rotatable about the axis C of the spool shaft 20 between a first position and a second position. In the first position illustrated in FIG. 8, the first side cover 16a (i.e., the attachment-detachment operating part 33) is allowed to be attached to or detached from the first side plate 15a. In the second position illustrated in FIG. 9, the first side cover 16a (i.e., the attachment-detachment operating part 33) is prevented from being attached to or detached from the first side plate 15a. The attachment-detachment operating part 33 is coupled to the first side plate 15a by the bayonet structure 36. The attachment-detachment operating part 33 has a protruding portion 33a. The protruding portion 33a is protruding from the first side cover 16a towards the first side plate 15a. The protruding portion 33a is disposed in a position away from the axis C of the spool shaft 20. When the attachment-detachment operating part 33 is set in the second position, the protruding portion 33a is configured to be locked by the lock member 34. In FIGS. 8 and 9, the pivot range between the first position and the second position is depicted with an angle α for convenience of explanation. It should be noted that positioning is required for the second position in order to align the contour of the first side cover 16a and that of the first side plate 15a. However, the first position can be arbitrarily set as long as the cam protrusions 36b and the cam receivers 36a in the bayonet structure 36 can be disengaged from each other. In other words, positioning is not required for the first position. Positioning can be herein performed for the second position by engaging the protruding portion 33a and the lock member 34. Alternatively, another rotation restriction part for positioning can be mounted between the first side cover 16a and the first side plate 15a.

Structure of Lock Member

The lock member 34 is a member made of, for instance, synthetic resin (polyamide resin, polyacetal resin, etc.). As illustrated in FIGS. 3, 6, and 8 to 11, the lock member 34 is mounted for locking-unlocking the attachment-detachment operating part 33 in the second position. The lock member 34 is attached to the outer lateral surface of the first side plate 15a, while being pivotable between a locked position illustrated in FIG. 10 and an unlocked position illustrated in FIG. 11. The locked position is disposed away from the unlocked position at an angle β. In the first exemplary embodiment, the angle β is roughly 90 degrees. However, the angle β is not limited to 90 degrees, and can be arbitrarily set as long as it falls within a range of 60 to 120 degrees.

The lock member 34 has a main body 34b and an operating portion 34c. The main body 34b has an engaging groove 34a allowed to be engaged with the protruding portion 33a. The operating portion 34c is a lever-shaped portion for operation. The main body 34b has a shaft portion 34d formed on and protruding from the center of the back surface thereof opposed to the first side plate 15a. The shaft portion 34d is fitted into an attachment hole (not illustrated in the figures), which is bored in the first side plate 15a in parallel to the spool shaft 20. The shaft portion 34d is disposed in parallel to the spool shaft 20. The main body 34b has the engaging groove 34a and a protruding portion 34e on the surface thereof that is not opposed to the first side plate 15a. The protruding portion 34e has an outer periphery formed circularly about a pivot center C1. The diameter of the protruding portion 34e is smaller than the diameters of the other portions. The engaging groove 34a has a first end 34f and a second end 34g. The first end 34f is opened in the outer periphery of the protruding portion 34e. The second end 34g is closed on the opposite side of the first end 34f. The first end 34f is linearly formed from the second end 34g. In the first exemplary embodiment, the engaging groove 34a is thereby formed in a U-shape. The second end 34g has a semicircular shape and is disposed concentrically to the pivot center C1 of the lock member 34. The second end 34g is thereby allowed to be engaged with the outer peripheral surface of the protruding portion 33a. Herein in the locked position, the lock member 34 is disposed such that the first end 34f of the engaging groove 34a is oriented in a direction roughly perpendicular to a circular arc R that is formed about the axis C of the spool shaft 20 and passes through the pivot center C1. i.e., a first direction that is different from a direction about the axis C of the spool shaft 20. Accordingly, even in attempting to rotate in a counterclockwise direction the attachment-detachment operating part 33 (i.e., the first side cover 16a) in FIG. 10, the protruding portion 33a is locked by the lock member 34, and the attachment-detachment operating part 33 is prevented from rotating towards the first position by the lock member 34. On the other hand, in the unlocked position, the lock member 34 is disposed such that the engaging groove 34a is oriented in a direction about the axis C of the spool shaft 20 along the circular arc R, i.e., a second direction. Accordingly, locking of the protruding portion 33a by the lock member 34 is released, and the attachment-detachment operating part 33 is allowed to be rotated towards the first position.

The main body 34b has two recesses 34h formed on the back surface thereof. A positioning member 44, which is configured to set the lock member 34 in the locked-unlocked position, is engaged with the recesses 34h. The recesses 34h are formed at the same interval as the pivot range. Therefore, the recesses 34h are disposed at an angular interval of 90 degrees in the first exemplary embodiment. As illustrated in FIG. 6, the positioning member 44 includes a positioning pin 44a and an urging member 44b. The positioning pin 44 is accommodated in the outer lateral surface of the first side plate 15a, while being allowed to be protruding therefrom and retracted thereto. The urging member 44b is made by a coil spring for urging the positioning pin 44 towards any of the recesses 34h. The positioning member 44 serves to position the lock member 34, and enables an angler to sense clicking feeling in the locked position and the unlocked position by producing sound and so forth. In operating the lock member 34, an angler can thereby reliably recognize that the lock member 34 has been set in either of the locked position and the unlocked position.

The operating portion 34c is extending radially outwards from the main body 34b. The operating portion 34c has an engaging protrusion 34i on the first side plate 15a side surface thereof. When the lock member 34 is set in either of the locked position and the unlocked position, the engaging protrusion 34i is contactable with an edge 15f of the first side plate 15a. Pivoting of the lock member 34 is thereby restricted within a pivot range between the locked position and the unlocked position. In the locked position, the operating portion 34c is configured to be disposed so as to be oriented obliquely rearwards. Accordingly, the fishing line becomes unlikely to get stuck with the operating portion 34c in fishing.

The lock member 34 is pivotably supported by the first side plate 15a and a support member 42 fixed to the outer lateral surface of the first side plate 15a by a fixation bolt 40. The support member 42 is a plate member formed in a roughly raindrop-like shape and is made of, for instance, metal such as stainless alloy. The support member 42 is provided for supporting and also pressing the lock member 34. The support member 42 has a fixation portion 42a, an anti-rotation protrusion 42b, and a support portion 42c. The fixation portion 42a is a small-diameter portion allowing the fixation bolt 40 to penetrate therethrough. The fixation portion 42a is disposed on one end of the support member 42. The anti-rotation protrusion 42b is protruding from the fixation portion 42a. The support portion 42c is a large-diameter portion disposed on the other end of the support member 42. The anti-rotation protrusion 42b is interposed and held between parts of an anti-rotation portion 15g formed on the outer lateral surface of the first side plate 15a. With the structure, rotation of the support member 42 is prevented. The support portion 42c makes contact with the outer periphery of the protruding portion 34e of the lock member 34, while making contact with a stepped surface 34j (see FIG. 6) formed on the main body 34b by the protruding portion 34e. The lock member 34 is thereby pressed and prevented from being separated away from the first side plate 15a. The support portion 42c has a fitting surface 42d formed in a circular-arc shape. The fitting surface 42d is allowed to be fitted onto the outer periphery of the protruding portion 34e. The center of the fitting surface 42d is substantially the same as the pivot center C1. Accordingly, the lock member 34 is pivotably supported by the support member 42. Therefore, the both ends of the lock member 34 are supported by the first side plate 15a and the support member 42 in the pivot axial direction.

In the lock member 34 structured as described above, when the lock member 34 is operated and set in the locked position while the attachment-detachment operating part 33 is disposed in the second position, the protruding portion 33a of the attachment-detachment operating part 33 is prevented from moving about the axis C of the spool shaft 20 by the lock member 34. Therefore, the first side cover 16a can be prevented from unexpectedly coming off from the first side plate 15a.

Other Structures of Dual-Bearing Reel

As illustrated in FIG. 5, the spool 14 is disposed between the first side plate 15a and the second side plate 15b. The spool 14 is rotatably supported by the reel unit 11. The spool 14 has a pair of flanges 14a and a bobbin trunk 14b. The flanges 14a are saucer-shaped portions disposed on the both lateral sides of the spool 14. The bobbin trunk 14b is a tubular portion disposed between the both flanges 14a. The spool 14 is fixed onto the spool shaft 20, which penetrates through the inner peripheral side of the bobbin trunk 14b, for instance, serration coupling, while being unitarily rotatable therewith.

As illustrated in FIG. 5, the spool shaft 20 is extending to the outside of the second side cover 16b, while penetrating through the second side plate 15b. The spool shaft 20 is made of, for instance, non-magnetic metal such as SUS304. One end (the left end in FIG. 5) of the spool shaft 20 is rotatably supported by the bearing accommodating portion 35a through the bearing 38a. The other end (the right end in FIG. 5) of the spool shaft 20 is extending to the outside of the second side cover 16b, and is rotatably supported by a boss 16d formed on the second side cover 16b through a bearing 38b. The spool shaft 20 has a large-diameter portion 20a in the axially intermediate part thereof. A clutch pin 21a, which forms a part of the clutch mechanism 21, is disposed while radially penetrating through a part of the large-diameter portion 20a, i.e., a part penetrating through the second side plate 15b. The both ends of the clutch pin 21a are protruding from the outer peripheral surface of the spool shaft 20.

As illustrated in FIG. 1, the clutch operating member 17 is disposed rearwards of the spool 14, while being disposed in the rear part of the space interposed between the first side plate 15a and the second side plate 15b. The clutch operating member 17 is coupled to the clutch control mechanism 22. The clutch operating member 17 is configured to be slid up and down between the first side plate 15a and the second side plate 15b. Accordingly, the clutch mechanism 21 is switched between a coupled state and a decoupled state. The clutch operating member 17 is guided in the up-and-down direction by a guide shaft 17a illustrated in FIG. 6 so as to be closer to or away from the fishing-rod attachment portion 15d.

As illustrated in FIG. 5, the gear mechanism 19 includes the drive shaft 30, a drive gear 31, and a pinion gear 32. The drive gear 31 is fixed onto the drive shaft 30. The pinion gear 32 is formed in a tubular shape and is meshed with the drive gear 31. The drive shaft 30 is rotatably attached to the second side plate 15b and the second side cover 16b. The drive shaft 30 is prevented from rotating in the fishing-line releasing direction (i.e., reversing) by a roller-type one-way clutch 50 and a claw-type one-way clutch. The roller-type one-way clutch 50 is attached between the second side cover 16b and the drive shaft 30. The drive gear 31 is rotatably mounted onto the drive shaft 30 and is coupled to the drive shaft 30 through the drag mechanism 23.

The pinion gear 32 is extending in the axial direction of the spool shaft 20, while penetrating through the second side plate 15b. The pinion gear 32 is a tubular member that the spool shaft 20 penetrates through the center part thereof. The pinion gear 32 is attached to the second side plate 15b and the second side cover 16b through a bearing 52 and a bearing 54, while being rotatable and axially movable. The pinion gear 32 has an engaging groove 32a formed on one end thereof (i.e., the left end in FIG. 5). The engaging groove 32a is engaged with the clutch pin 21a. The pinion gear 32 and the clutch pin 21a form the clutch mechanism 21. The pinion gear 32 is moved between a clutch-on position and a clutch-off position by the clutch control mechanism 22. In FIG. 5, the clutch-on position is depicted on the upper side of the axis C of the spool shaft 20, whereas the clutch-off position is depicted on the lower side of the axis C of the spool shaft 20.

As illustrated in FIG. 4, the clutch control mechanism 22 includes a clutch yoke 45. The clutch yoke 45 is a member for moving the pinion gear 32 along the axial direction of the spool shaft 20. When the clutch operating member 17 is operated and set in the clutch-off position, the clutch yoke 45 is configured to move the pinion gear 32 to the clutch-off position. Further, the clutch control mechanism 22 includes a clutch return mechanism (not illustrated in the figures). The clutch return mechanism is configured to turn on the clutch mechanism 21 (i.e., a clutch-on state) in conjunction with the rotation of the spool 14 in the fishing-line winding direction.

Figure 7:
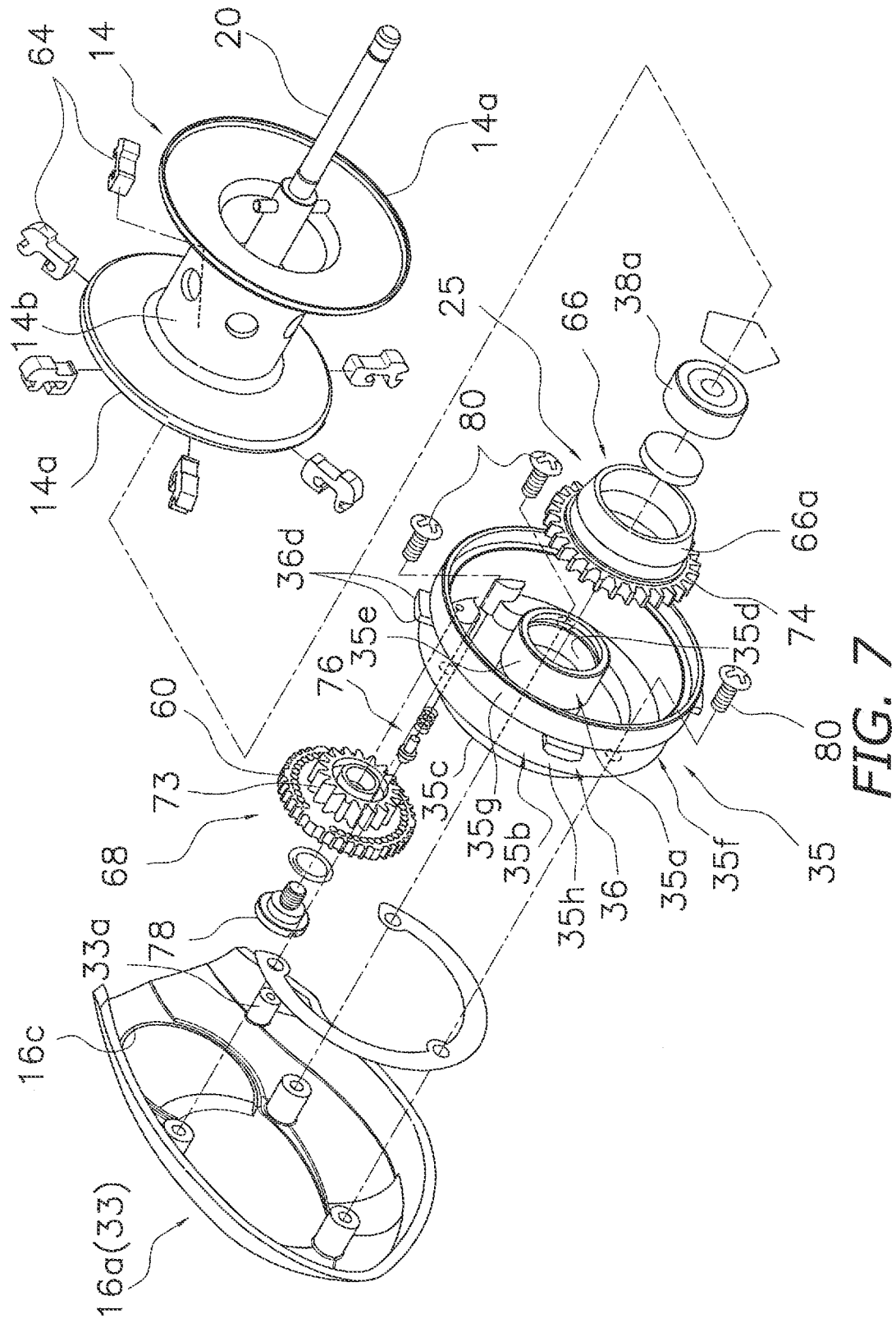
FIG. 7 is an exploded perspective view of first side cover related components including a shaft support part.

The spool brake mechanism 25 is configured to brake the spool 14 by centrifugal force. As illustrated in FIGS. 4, 5, and 7, the spool brake mechanism 25 includes a rotary member 62, a plurality of (e.g., six) brake shoes 64, the brake drum 66, and the moving mechanism 68. The spool brake mechanism 25 is mounted to the spool shaft 20 and the shaft support part 35. The plural brake shoes 64 are elastically engaged with the rotary member 62, while being detachable therefrom and being pivotable about an axis arranged skew to the spool shaft 20. The brake drum 66 is disposed radially inwards of the brake shoes 64, while being contactable with the pivotable brake shoes 64. The brake drum 66 has an outer peripheral surface 66a. The outer peripheral surface 66a is a tapered surface slanted towards the spool 14.

Figure 3:
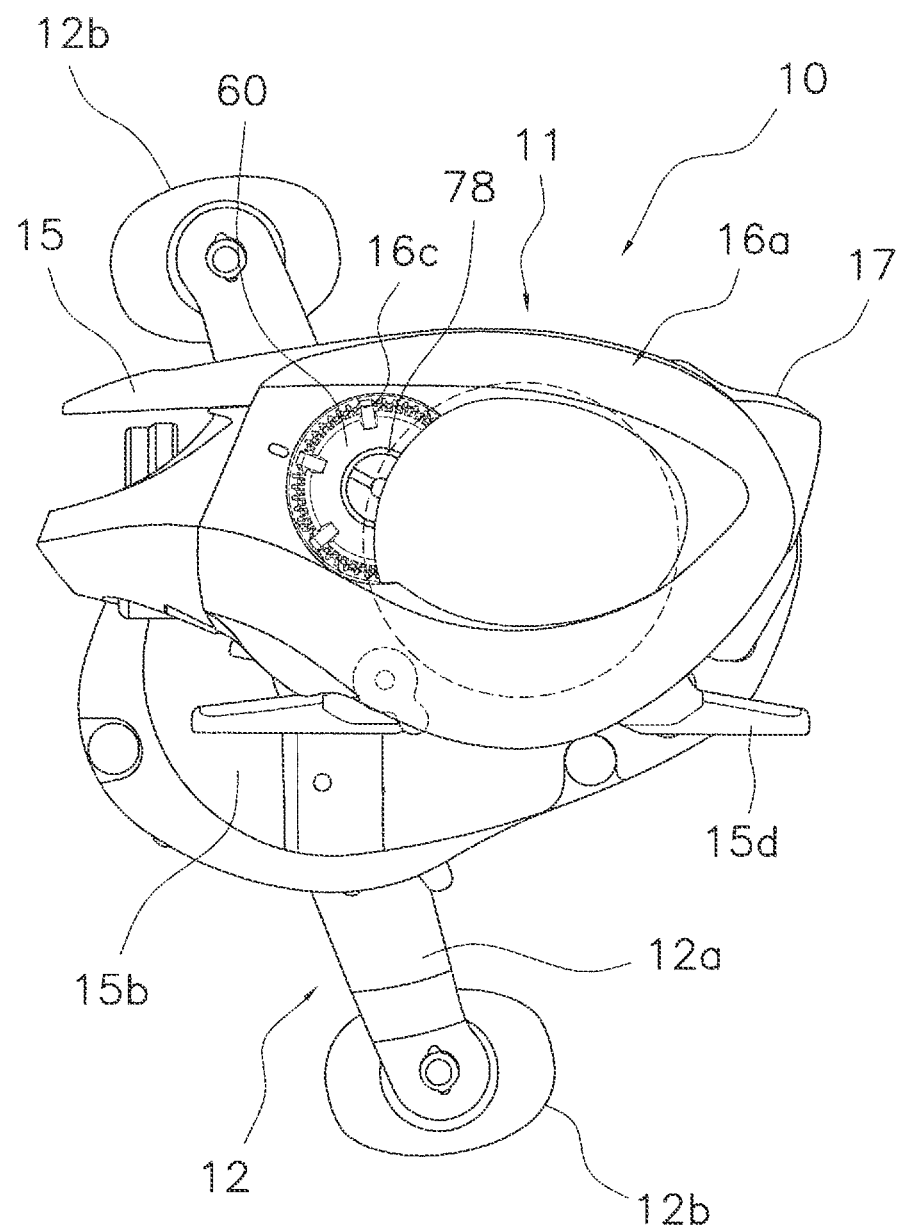
FIG. 3 is a right side view of the dual-bearing reel.

The moving mechanism 68 can move the brake shoes 64 and the brake drum 66 relatively to each other in the axial direction of the spool shaft 20, and can also position the brake shoes 64 and the brake drum 66 in the axial direction of the spool shaft 20. As illustrated in FIGS. 4 and 7, the moving mechanism 68 includes the operating member 60, the brake cam 71 (see FIG. 4), a first gear member 73 (see FIG. 7), and a second gear member 74 meshed with the first gear member 73. The operating member 60 is a circular knob made of, for instance, synthetic resin. As illustrated in FIG. 3, the operating member 60 is exposed to the outside from the first side cover 16a through an opening 16c bored in the first side cover 16a. The operating member 60 is rotatably supported by a screw shaft 78 to be screwed into the outer lateral surface of the bottom portion 35c of the shaft support part 35.

The operating member 60 is set in any of the positions with a plurality of levels (e.g., roughly 40 levels) by a positioning mechanism 76. The first gear member 73 is integrally formed with the operating member 60. The second gear member 74 is coupled to the brake drum 66 while being unitarily rotatable therewith.

The brake drum 66 is engaged with the shaft support part 35 through the brake cam 71. The brake cam 71 is a member divided into two semicircular pieces. The brake cam 71 is non-rotatably fixed to the outer peripheral surface of the shaft support part 35. The brake cam 71 has a helical cam groove 71a. The helical cam groove 71a is engaged with a plurality of cam protrusions 66b, which are, for instance, formed on and protruding from the inner peripheral surface of the brake drum 66. Accordingly, when the operating member 60 is operated and rotated in one direction, the brake drum 66 is moved in a direction closer to the spool 14. Braking force is thereby gradually increased. On the other hand, when the opening member 60 is operated and rotated in the other direction, the brake drum 66 is moved in a direction away from the spool 14. Braking force is thereby gradually reduced.

Operation and Action of Reel in Actual Fishing

In casting, the clutch operating lever 17 is pressed down for switching the clutch mechanism 21 into a clutch-off state. In the clutch-off state, the spool 14 can be freely rotated. When casting is performed under the condition, the fishing line is reeled out of the spool 14 with high momentum due to the weight of a terminal tackle. When the spool 14 is rotated in casting, the spool 14 is braked by the spool brake device 25.

When the terminal tackle lands in the water, the handle 12 is rotated in the fishing-line winding direction. Accordingly, the clutch mechanism 21 is switched into the clutch-on state by the clutch return mechanism (not illustrated in the figures). Thus, an angler waits for fish bite the bait while holding the reel unit 11 in the palm under the condition.

In such dual-bearing reel, the attachment-detachment operating part 33 is configured to be locked by the lock member 34 when the lock member 34 is operated and set in the locked position while the attachment-detachment operating part 33 is located in the second position. Therefore, the attachment-detachment operating part 33 can be prevented from being erroneously rotated towards the first position by an angler's operation or can be prevented from spontaneously rotating to the second position. As a result, the first side cover 16a can be prevented from unexpectedly coming off from the reel unit 11.

Second Exemplary Embodiment

In the dual-bearing reel 10 according to the first exemplary embodiment, the first side cover 16a has a function of the attachment-detachment operating part 33. In contrast, in a dual-bearing reel 110 according to a second exemplary embodiment illustrated in FIG. 12, an attachment-detachment operating part 133 is provided as a separate component independently from a first side cover 116a. It should be noted that in the following description, explanation will be made for only such structures and actions that are different from those in the first exemplary embodiment, whereas explanation will not be made for such structures and actions that are the same as those in the first exemplary embodiment. It should be also noted that in FIG. 12, the same reference numerals are assigned to components similar to the corresponding ones of the first exemplary embodiments, while three-digit reference numbers are assigned to components structured differently from the corresponding ones of the first exemplary embodiment. The last two digits of the three-digit numbers herein correspond to reference numbers assigned to the corresponding components of the first exemplary embodiment.

Figure 12:
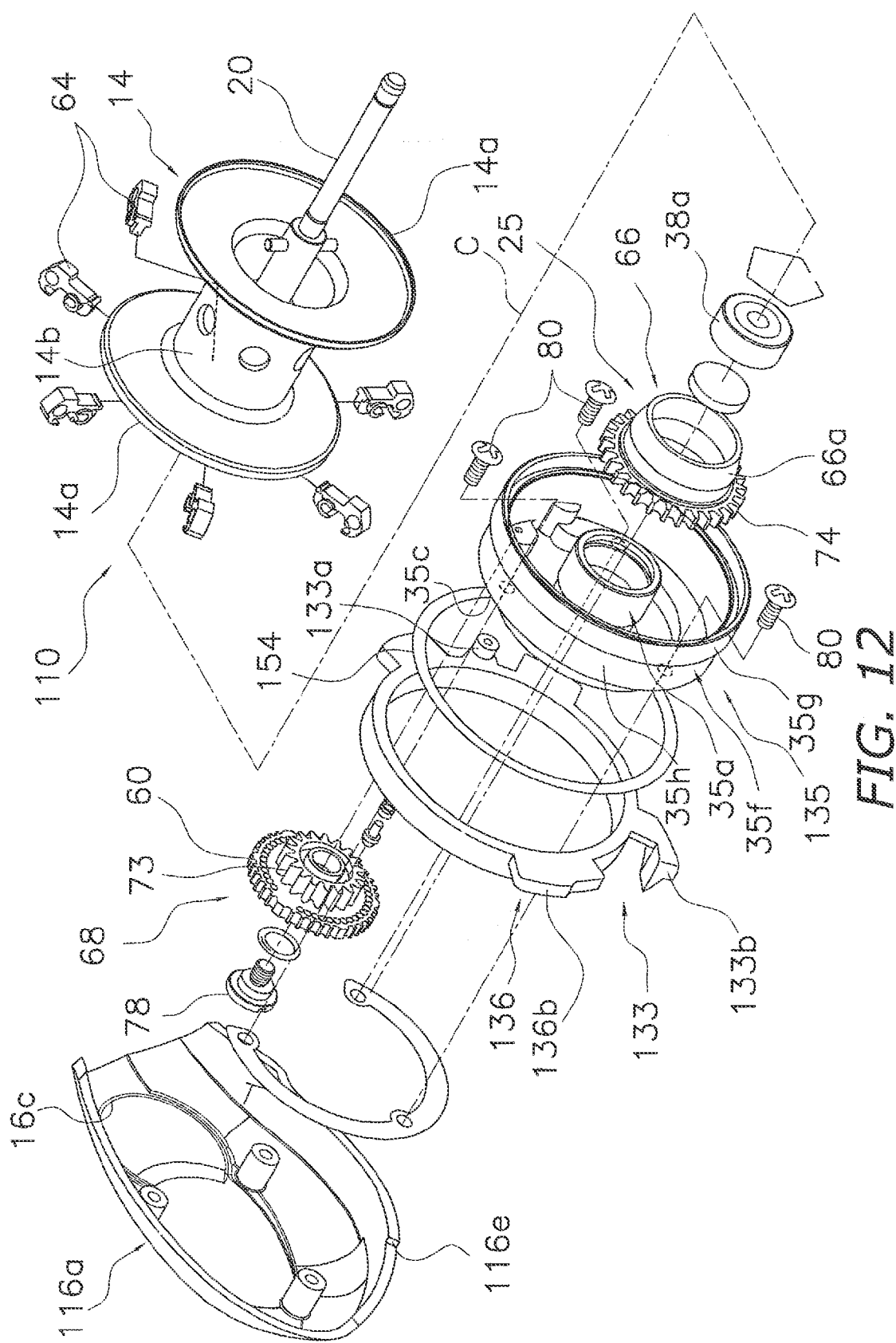
FIG. 12 is a diagram corresponding to FIG. 7 in a second exemplary embodiment.

In FIG. 12, a shaft support part 135 is structured by removing the cam protrusions 36b, which forms a part of the bayonet structure 36, from the shaft support part 35 in the first exemplary embodiment. The shaft support part 135 has the bearing accommodating portion 35a, the attaching portion 35b, and the bottom portion 35c, which are structured similarly to those of the shaft support part 35 in the first exemplary embodiment. The fitting portion 35g and the tubular portion 35h are formed on the outer peripheral surface 35f of the attaching portion 35b. The fitting portion 35g is fitted to the opening 15e. The tubular portion 35h has a diameter smaller than that of the fitting portion 35g.

A bayonet structure 136 includes a plurality of (e.g., three) cam receivers (not illustrated in the figure) and a plurality of (e.g., three) cam protrusions 136b. The cam receivers are formed on the outer lateral surface of the first side plate 15a, while being circumferentially aligned at predetermined intervals in the surrounding of the opening 15c. The cam protrusions 136b are integrally formed with the attachment-detachment operating part 133, while being radially protruding.

The attachment-detachment operating part 133 is a roughly ring-shaped member to be rotatably fitted onto the tubular portion 35h of the shaft support part 135. The attachment-detachment operating part 133 has the cam protrusions 136b formed on the outer peripheral surface thereof. Further, the attachment-detachment operating part 133 has a protruding portion 133a formed on the back surface thereof (i.e., the first side plate 15a side surface). The protruding portion 133a is protruding towards the first side plate 15a.

The protruding portion 133a is engaged with the lock member 34. Yet further, the attachment-detachment operating part 133 has an operating portion 13b formed on the outer peripheral surface thereof. The operating portion 133b serves to operate and set the attachment-detachment operating part 133 in either the first position or the second position. In the rear part of the reel unit 11, the operating portion 133b is extending to the outside of the first side cover 116a from a recess 116e formed on the first side cover 116a. An annular sheet washer member 154 is disposed between the attachment-detachment operating part 133 and the fitting portion 35g. The washer member 154 is a member made of synthetic resin with high slidability. The washer member 154 is provided for smoothly rotating the attachment-detachment operating part 133. Rotation of the attachment-detachment operating part 133 is restricted to a range between the first position and the second position by a rotation restriction part (not illustrated in the figures) mounted to the first side plate 15a. Further, the attachment-detachment operating part 133 is restricted from axially moving, while being interposed between the shaft support part 135 and the first side cover 116a. The lock member 34 is structured similarly to that of the first exemplary embodiment. Therefore, explanation will not be made for the lock member 34.

In the dual-bearing reel 110 according to the second exemplary embodiment structured as described above, when the attachment-detachment operating part 133 is operated and set in the second position, and further, the lock member 34 is operated and set in the locked position, the protruding portion 133a is restricted from being rotated about the axis C of the spool shaft 20. Thus, the attachment-detachment operating part 133 is locked. On the other hand, when the lock member 34 is operated and set in the unlocked position, the attachment-detachment operating part 133 is allowed to be rotated from the second position to the first position. When the attachment-detachment operating part 133 is rotated from the second position to the first position by operating the operating portion 133b under the condition, the first side cover 116a can be detached from the first side plate 15a together with the attachment-detachment operating part 133 and the shaft support part 135.

The aforementioned dual-bearing reel 110 according to the second exemplary embodiment can also achieve advantageous effects similar to those achieved by the dual-bearing reel 10 according to the first exemplary embodiment.

Third Exemplary Embodiment

Figure 13:
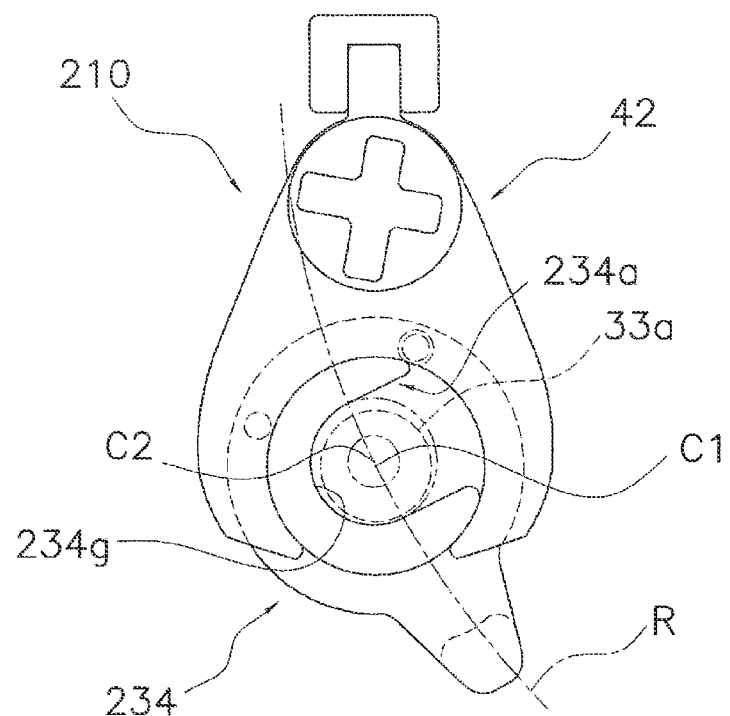
FIG. 13 is an enlarged side view of the lock member set in the locked position in a third exemplary embodiment.

As illustrated in FIG. 13, in a dual-bearing reel 210 according to a third exemplary embodiment, a center position C2 of a semicircle formed by a second end 234g of a lock member 234 is displaced from the pivot center C1. Therefore, an engaging groove 234a is entirely disposed eccentrically to the pivot center C1. For example, when the lock member 234 is operated and set in the locked position illustrated in FIG. 13, the position C2 is preferably set to be away in a clockwise direction from the pivot center C1 on the circular arc R that is formed about the axis C of the spool shaft 20 and passes through the pivot center C1. With the structure, the protruding portion 33a of the attachment-detachment operating part 33 can be pressed by the engaging groove 234a in the clockwise direction of the circular arc R, when the lock member 234 is operated from the unlocked position illustrated in FIG. 14 to the locked position illustrated in FIG. 13. By pressing the protruding portion 33a, the attachment-detachment operating part 33 is prevented from being easily loosened, while wobbling of the first side cover 16a can be stopped through the attachment-detachment operating part 33.

Figure 15:
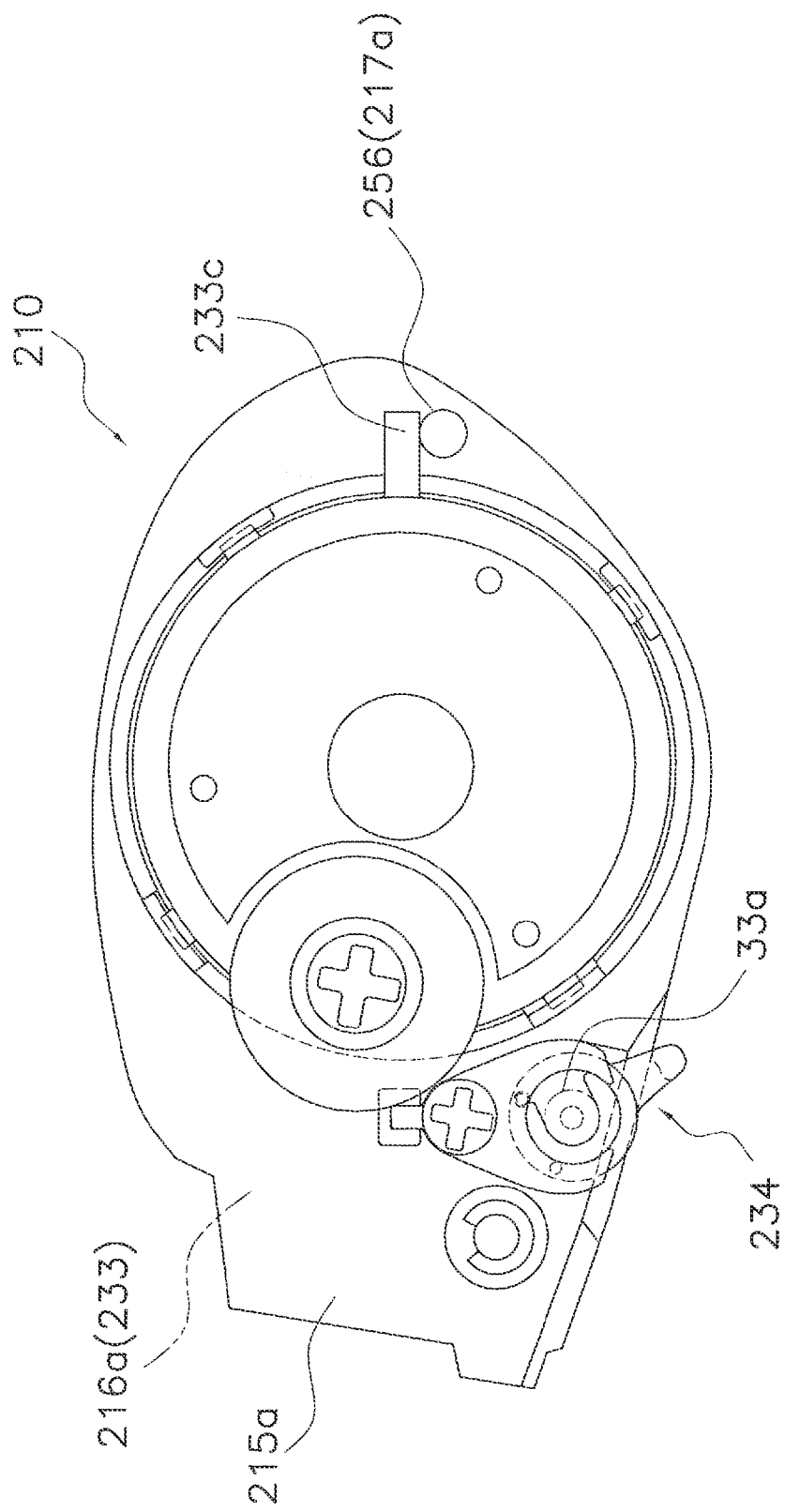
FIG. 15 is a diagram corresponding to FIG. 9 in the third exemplary embodiment.

As illustrated in FIG. 15, wobbling can be more reliably stopped especially when an attachment-detachment operating part 233, provided for a first side cover 216a, is provided with a restricted portion 233c extending in the radial direction while a first side plate 215a is provided with a rotation restriction part 256 configured to make contact with the restricted portion 233c in the second position. In other words, in the structure that the first side plate 215a is provided with the rotation restriction part 256, the attachment-detachment operating part 233 is interposed and held between the lock member 234 and the rotation restriction part 256 when the first side cover 216a is pressed by the lock member 234 in the clockwise direction of FIG. 15. Wobbling can be thereby unlikely to be caused.

Figure 14:
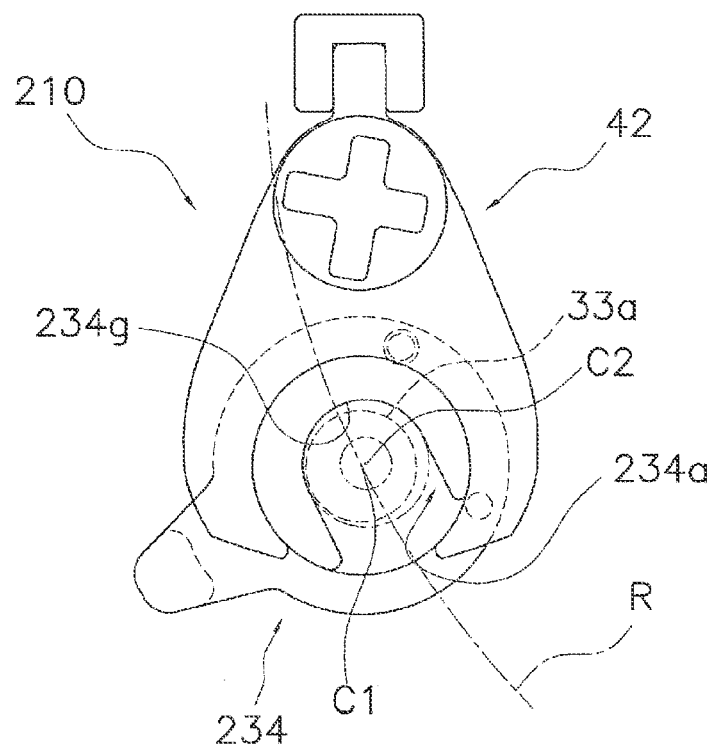
FIG. 14 is an enlarged side view of the lock member set in the unlocked position in the third exemplary embodiment.

It should be noted that the structure of setting the pivot center C1 and the position C2 eccentrically to each other is not limited to that illustrated in FIG. 13 and FIG. 14. For example, the engaging groove can be formed with a structure similar to that of the first exemplary embodiment, and the shaft portion can be disposed in a position eccentric to the engaging groove.

Further in FIG. 15, a guide shaft 217a for guiding the clutch operating member 17 is used as the rotation restriction part 256. Specifically, the guide shaft 217a is a member formed by elongating the guide shaft 17a of the first exemplary embodiment. The guide shaft 217a is protruding from the outer lateral surface of the first side plate 215a, while penetrating through the first side plate 215a. With the guide shaft 217a, the first side cover 216a is not required to be provided with an unnecessary boss. The dual-bearing reel can be thereby simply structured.

Features

The aforementioned exemplary embodiments can be expressed as follows.

(A) The dual-bearing reel 10 is configured to forwardly reel out the fishing line. The dual-bearing reel 10 includes the reel unit 11, the spool 14 for winding the fishing line, the spool shaft 20, the handle 12, the attachment-detachment operating part 33, and the lock member 34. The reel unit 11 includes the frame 15, the first side cover 16a, and the second side cover 16b. The frame 15 includes the first side plate 15a and the second side plate 15b disposed in opposition to the first side plate 15a. The first side cover 16a is detachably attached to the first side plate 15a and covers the outside of the first side plate 15a. The second side cover 16b covers the outside of the second side plate 15b. The spool 14 is disposed between the first side plate 15a and the second side plate 15b. The spool 14 is rotatably supported by the reel unit 11. The spool shaft 20 is a member onto which the spool 14 is mounted. The handle 12 is rotatably mounted to the second side cover 16b side to rotationally drive the spool 14. The attachment-detachment operating part 33 is a part for performing an attachment-detachment operation of the first side cover 16a. The attachment-detachment operating part 33 has the protruding portion 33a protruding towards the first side plate 15a in a position away from the axis C of the spool shaft 20. The attachment-detachment operating part 33 is mounted rotatably about the axis C of the spool shaft 20 between the first position and the second position. The first position allows the first side cover 16a to be attached to or detached from the first side plate 15a, whereas the second position prevents the first side cover 16a from being attached to or detached from the first side plate 15a. The lock member 34 has the engaging groove 34a allowed to be engaged with the protruding portion 33a. The engaging groove 34a has the first end 34f and the second end 34g. The first end 34f is opened, whereas the second end 34g is closed and disposed on the opposite side of the first end 34f. The lock member 34 is mounted to the reel unit 11 so as to be movable between the locked position and the unlocked position. The locked position causes the engaging groove 34a to be oriented in the first direction arranged different from a direction about the axis C of the spool shaft 20 while the engaging groove 34a is engaged with the protruding portion 33a when the attachment-detachment operating part 33 is set in the second position. The unlocked position is shifted from the locked position and allows the attachment-detachment operating part 33 to be rotated.

In the dual-bearing reel 10, when the lock member 34 is operated and set in the locked position while the attachment-detachment operating part 33 is set in the second position, the engaging groove 34a, which is engaged with the protruding portion 33a provided for the attachment-detachment operating part 33, is oriented in a direction different from the direction about the axis C of the spool shaft 20, i.e., in a direction different from the rotational direction of the attachment-detachment operating part 33. Therefore, the rotational operation of the attachment-detachment operating part 33 is prevented. On the other hand, when the lock member 34 is operated and set in the unlocked position, the attachment-detachment operating part 33 becomes rotatable and can be operated and rotated from the second position to the first position. The first side cover 16a can be thereby detached from the first side plate 15a. Rotation of the attachment-detachment operating part 33 can be herein hindered by disposing the lock member 34 in the locked position while the attachment-detachment operating part 33 is disposed in the second position that the first side cover 16a cannot be attached to or detached from the first side plate 15a. Therefore, the first side cover 16a can be prevented from unexpectedly coming off from the first side plate 15a.

(B) The lock member 34 can be mounted to the first side plate 15a so as to be pivotable between the locked position and the unlocked position about the axis arranged in parallel to the spool shaft 20. The engaging groove 34a can be configured to be oriented in the first direction when the lock member 34 is disposed in the locked position. On the other hand, the engaging groove 34a can be configured to be oriented in the second direction arranged along the direction about the axis C of the spool shaft 20 when the lock member 34 is disposed in the unlocked position. Accordingly, the attachment-detachment operating part 33 can be locked or unlocked in conjunction with the pivot of the lock member 34. Therefore, the lock member 34 can be simply structured with a small size.

(C) The first side plate 15a can have the opening 15e formed in a circular shape about the axis C of the spool shaft 20 so as to allow the spool 14 to pass therethrough. Further, the reel unit 11 can include the shaft support part 35. The shaft support part 35 is detachably mounted to the opening 15e. The shaft support part 35 is coupled to the first side cover 16a so as to be unitarily rotatable therewith. The shaft support part 35 allows the bearing 38a to be accommodated therein. The bearing 38a supports one end of the spool shaft 20 in a rotatable state. In this case, the reel unit 11 includes the shaft support part 35 detachably mounted to the opening 15e. Therefore, attachment and detachment of the first side cover 16a is enabled by structuring the attachment-detachment operating part such that attachment and detachment of the shaft support part 35 is enabled.

(D) The shaft support part 35 can be detachably coupled to the opening 15e by the bayonet structure 36. Further, the attachment-detachment operating part 33 can be provided for the first side cover 16a. In this case, it is possible to make the first side cover 16a function as the attachment-detachment operating part 33 for attaching-detaching the first side cover 16a by rotating the first side cover 16a between the first position and the second position. Therefore, the attachment-detachment operating part 33 can be simply structured. Further, the rotational operation amount, required for the rotational operation of the first side cover 16a, is reduced by employing the bayonet structure 36.

(E) The attachment-detachment operating part 33 can be mounted to the shaft support part 35 so as to be rotatable between the first position and the second position. Further, the attachment-detachment operating part 33 can be detachably coupled to the opening 15e by the bayonet structure 36. In this case, only the attachment-detachment operating part 33 is required to be rotated between the first position and the second position without rotating the first side cover 16a itself. Therefore, the attachment-detachment operation can be easily performed. Further, the rotational operation amount, required for the rotational operation of the attachment-detachment operating part 33, is reduced by employing the bayonet structure 36.

(F) The lock member 34 can include the main body 34b and the operating portion 34c. The main body 34b has the engaging groove 34a and is pivotably coupled to the first side plate 15a. The operating portion 34c is radially protruding from the main body 34b. In this case, the pivot operation can be easily performed with the operating portion 34c radially protruding from the main body 34b.

(G) The main body 34b can have the protruding portion 34e with the outer periphery formed circularly about the pivot center C1 of the lock member 34. Further, the dual-bearing reel 10 can further include the support member 42. The support member 42 is fixed to the first side plate 15a. The support member 42 has the fitting surface 42d allowing the outer periphery of the protruding portion 34e of the main body 34b to be fitted thereto. In this case, the main body 34b of the lock member 34 is pivotably mounted to the first side plate 15a through the support member 42 that is fixed to the first side plate 15a and is fitted to the outer periphery of the protruding portion 34e of the main body 34b. Therefore, the pivotable lock member 34 can be accurately fixed to the first side plate 15a in comparison with the structure that the lock member 34 is directly mounted to the first side plate 15a in a pivotable state.

(H) The second end 34g of the engaging groove 34a can be formed in a semicircular shape, whereas the first end 34f of the engaging groove 34a can be formed in a linear shape extending from the second end 34g. In this case, the engaging groove 34a is formed in a U-shape. Therefore, the protruding portion 33a can be easily locked or unlocked by the pivot of the lock member 34. Further, the protruding portion 33a can be also locked and unlocked by linearly moving the lock member 34.

(I) The position C2 being located in the center of the semicircular shape formed by the second end 34g of the engaging groove 34a can be matched with the pivot center C1. In this case, the pivot center C1 of the lock member 34 is matched with the position C2 located in the center of the semicircular shape. Therefore, the position C2 located in the center of the semicircular shape is not changed even when the lock member 34 is pivoted. The protruding portion 33a can be thereby accurately locked.

(J) The position C2 being located in the center of the semicircular shape formed by the second end 234g of the engaging groove 234a can be displaced from the pivot center C1. In this case, when the lock member 234 is pivoted, the semicircular second end 234g of the engaging groove 234a is moved by the amount eccentric to the pivot center C1. Accordingly, the protruding portion 33a can be moved. The attachment-detachment operating part 233 can be thereby unlikely to be loosened.

(K) The position C2 being located in the center of the semicircular shape formed by the second end 234g of the engaging groove 234a can be displaced from the pivot center C1 such that the attachment-detachment operating part 233 is pressed at least in the rotational direction from the first position to the second position when the lock member 234 is operated and pivoted from the unlocked position to the locked position. In this case, when operated and pivoted from the unlocked position to the locked position, the lock member further presses the protruding portion 33a of the attachment-detachment operating part 233 that is disposed in the second position. The attachment-detachment operating part 233 can be thereby unlikely to be loosened.

(L) The dual-bearing reel 10 can further include a rotation restriction part 256. The rotation restriction part 256 is disposed so as to be contactable with the attachment-detachment operating part 233 disposed in the second position. The rotation restriction part 256 restricts the attachment-detachment operating part 233 from rotating with respect to the first side plate 215a. In this case, the attachment-detachment operating part 233 is interposed and held between the rotation restriction part 256 and the lock member 234. Wobbling of the attachment-detachment operating part 233 can be thereby unlikely to be caused.

(M) The dual-bearing reel 210 can further include the clutch mechanism 21, the clutch operating member 17 and the guide shaft 217a. The clutch mechanism 21 is allowed to be set in the clutch-on state and the clutch-off state. The clutch-on state causes the handle 12 and the spool 14 to be coupled to each other. The clutch-off state causes the handle 12 and the spool 14 to be decoupled from each other. The clutch operating member 17 is movably disposed in the rear part of the reel unit 11 and between the first side plate 15a and the second side plate 15b to operate the clutch mechanism 21. The clutch operating member 17 allows the clutch mechanism 21 to be switched from the clutch-on state to the clutch-off state. The guide shaft 217a is extending towards the first side cover 216a while penetrating through the first side plate 215a. The guide shaft 217a guides moving of the clutch operating member 17. Further, the rotation restriction part 256 is formed by the guide shaft 217a.

In this case, the guide shaft 217a guiding the clutch operating member 17 can be used as the rotation restriction part 256. Therefore, the dual-bearing reel 210 can be simply structured.

Other Exemplary Embodiments

An exemplary embodiment of the present invention has been explained. However, the present invention is not limited to the aforementioned exemplary embodiment, and a variety of changes can be herein made without departing from the scope of the present invention. Especially, the plurality of exemplary embodiments and modifications described in the present specification can be arbitrarily used in combination on an as-needed basis.

(a) In the aforementioned exemplary embodiment, the low-profile dual-bearing reel for bait casting has been exemplified for explaining the present invention. However, the present invention can be applied to round dual-bearing reels.

(b) In the aforementioned exemplary embodiment, the dual-bearing reel configured to brake the spool by centrifugal force has been exemplified for explaining the present invention. However, the spool brake mechanism can be structured as a mechanism of any suitable type (e.g., a mechanical type, an electric type, etc.).

(c) In the aforementioned exemplary embodiment, the second end 34g of the engaging groove 34a is formed in a semicircular shape. However, the shape of the second end in the present invention is not limited to the above. The second end can be formed in any suitable shape as long as it is engaged with the protruding portion. For example, the second end can be formed in a linear shape or can be formed in a curved shape.

(d) In the aforementioned exemplary embodiment, the lock member 34 is formed in a lever shape. However, the lock member can be formed in a dial shape.

Advantageous Effects of Invention

According to the present invention, the attachment-detachment operating part can be prevented from rotating with the structure that the lock member is disposed in the locked position while the attachment-detachment operating part is disposed in the second position that the first side cover is prevented from being attached to and detached from the first side plate. Therefore, the first side cover can be prevented from unexpectedly coming off from the first side plate.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel being configured to forwardly reel out a fishing line, comprising:
   a reel unit including a frame having a first side plate and a second side plate disposed opposite to the first side plate, a first side cover being detachably attached to the first side plate and covering an outside of the first side plate, and a second side cover covering an outside of the second side plate;

a spool being configured to wind the fishing line, the spool being disposed between the first side plate and the second side plate, the spool being rotatably supported by the reel unit;

a spool shaft onto which the spool is mounted;

a handle being rotatably mounted to the second side cover side to rotationally drive the spool;

an attachment-detachment operating part having a protruding portion protruding towards the first side plate from a position away from an axis of the spool shaft, the attachment-detachment operating part being mounted rotatably about the spool shaft between a first position and a second position, the first side cover being attachable to and detachable from the first side plate when the attachment-detachment operating part is at the first position, the first side cover being non-attachable to and non-detachable from the first side plate when the attachment-detachment operating part is at the second position; and a lock member having an engaging groove, the engaging groove being configured to be engaged with the protruding portion, the engaging groove having a first end and a second end, the first end being open, the second end being closed and disposed on an opposite side of the first end, the lock member being mounted to the reel unit so as to be movable between a locked position and an unlocked position, the engaging groove being oriented in a first direction arranged different from a direction about the spool shaft in order for the engaging groove to be engaged with the protruding portion when the attachment-detachment operating part is at the second position and when the lock member is at the locked position, the attachment-detachment operating part being rotatable when the lock member is at the unlocked position.

2. A dual-bearing reel being configured to forwardly reel out a fishing line, comprising:

a reel unit including a frame having a first side plate and a second side plate disposed opposite to the first side plate, a first side cover being detachably attached to the first side plate and covering an outside of the first side plate, and a second side cover covering an outside of the second side plate;

a spool being configured to wind the fishing line, the spool being disposed between the first side plate and the second side plate, the spool being rotatably supported by the reel unit;

a spool shaft onto which the spool is mounted;

a handle being rotatably mounted to the second side cover side to rotationally drive the spool;

an attachment-detachment operating part having a protruding portion protruding towards the first side plate from a position away from an axis of the spool shaft, the attachment-detachment operating part being mounted rotatably about the spool shaft between a first position and a second position, the first side cover being attachable to and detachable from the first side plate when the attachment-detachment operating part is at the first position, the first side cover being non-attachable to and non-detachable from the first side plate when, the attachment-detachment operating part is at the second position; and a lock member having an engaging groove, the engaging groove being allowed to be engaged with the protruding portion, the engaging groove having a first end and a second end, the first end being open, the second end being closed and disposed on an opposite side of the first end, the lock member being mounted to the reel unit so as to be movable between a locked position and an unlocked position, and the lock member being mounted to the first side plate so as to be pivotable between the locked position and the unlocked position about an axis thereof which is arranged in parallel to the spool shaft, the engaging groove being oriented in a first direction arranged different from a direction about the spool shaft in order for the engaging groove to be engaged with the protruding portion when the attachment-detachment operating part is at the second position and when the lock member is at the locked position, the engaging groove being configured to be oriented in the first direction when the lock member is disposed in the locked position, and the engaging groove being configured to be oriented in a second direction arranged along the direction about the spool shaft when the lock member is disposed in the unlocked position, and the attachment-detachment operating part being rotatable when the lock member is at the unlocked position.

3. The dual-bearing reel according to claim 2, wherein the first side plate has an opening formed circularly about the axis of the spool shaft, the spool is arranged to pass through the opening, the reel unit includes a shaft support part, the shaft support part is detachably mounted to the opening, the shaft support part is coupled to the first side cover so as to be unitarily rotatable therewith, the shaft support part accommodates a bearing, and the bearing supports an end of the spool shaft in a rotatable state.

4. The dual-bearing reel according to claim 3, wherein the shaft support part is detachably coupled to the opening by a bayonet structure, and the attachment-detachment operating part is provided for the first side cover.

5. The dual-bearing reel according to claim 3, wherein the attachment-detachment operating part is mounted to the shaft support part so as to be rotatable between the first position and the second position, and the attachment-detachment operating part is detachably coupled to the opening by a bayonet structure.

6. The dual-hearing reel according to claim 2, wherein the lock member includes a main body and an operating portion, the engaging groove is on the main body, the main body is pivotably coupled to the first side plate, and the operating portion is radially protruding from the main body.

7. The dual-bearing reel according to claim 6, wherein the main body has a protruding portion with an outer periphery formed circularly about a pivot center of the lock member, the dual-bearing reel further includes a support member, the support member is fixed to the first side plate, the support member includes a fitting surface, and the outer periphery of the protruding portion of the main body is fitted thereto.

8. The dual-bearing reel according to claim 7, wherein the second end of the engaging groove is formed in a semicircular shape, and the first end of the engaging groove is formed in a linear shape extending from the second end.

9. The dual-bearing reel according to claim 8, wherein a center position of the semicircular shape formed by the second end of the engaging groove is matched with the pivot center.

10. The dual-hearing reel according to claim 8, wherein a center position of the semicircular shape formed by the second end of the engaging groove is displaced from the pivot center.

11. The dual-hearing reel according to claim 10, wherein the center position of the semicircular shape of the second end of the engaging groove is displaced from the pivot center such that the attachment-detachment operating part is pressed at least in a direction from the first position to the second position when the lock member is operated and pivoted from the unlocked position to the locked position.

12. The dual-bearing reel according to claim 11, further comprising
a rotation restriction part being configured to contact with the attachment-detachment operating part disposed in the second position, wherein
the rotation restriction part is configured to restrict the attachment-detachment operating part from rotating with respect to the first side plate.

13. The dual-bearing reel according to claim 12, further comprising
a clutch mechanism being configured to couple the handle and the spool;
a clutch operating member being movably disposed in a rear part of the reel unit and between the first side plate and the second side plate to operate the clutch mechanism for coupling the handle and the spool; and
a guide shaft extending towards the first side cover while penetrating through the first side plate, the guide shaft guiding the clutch operating member in moving, wherein
the rotation restriction part is formed by the guide shaft.

* * * * *